United States Patent Office 3,331,541
Patented July 18, 1967

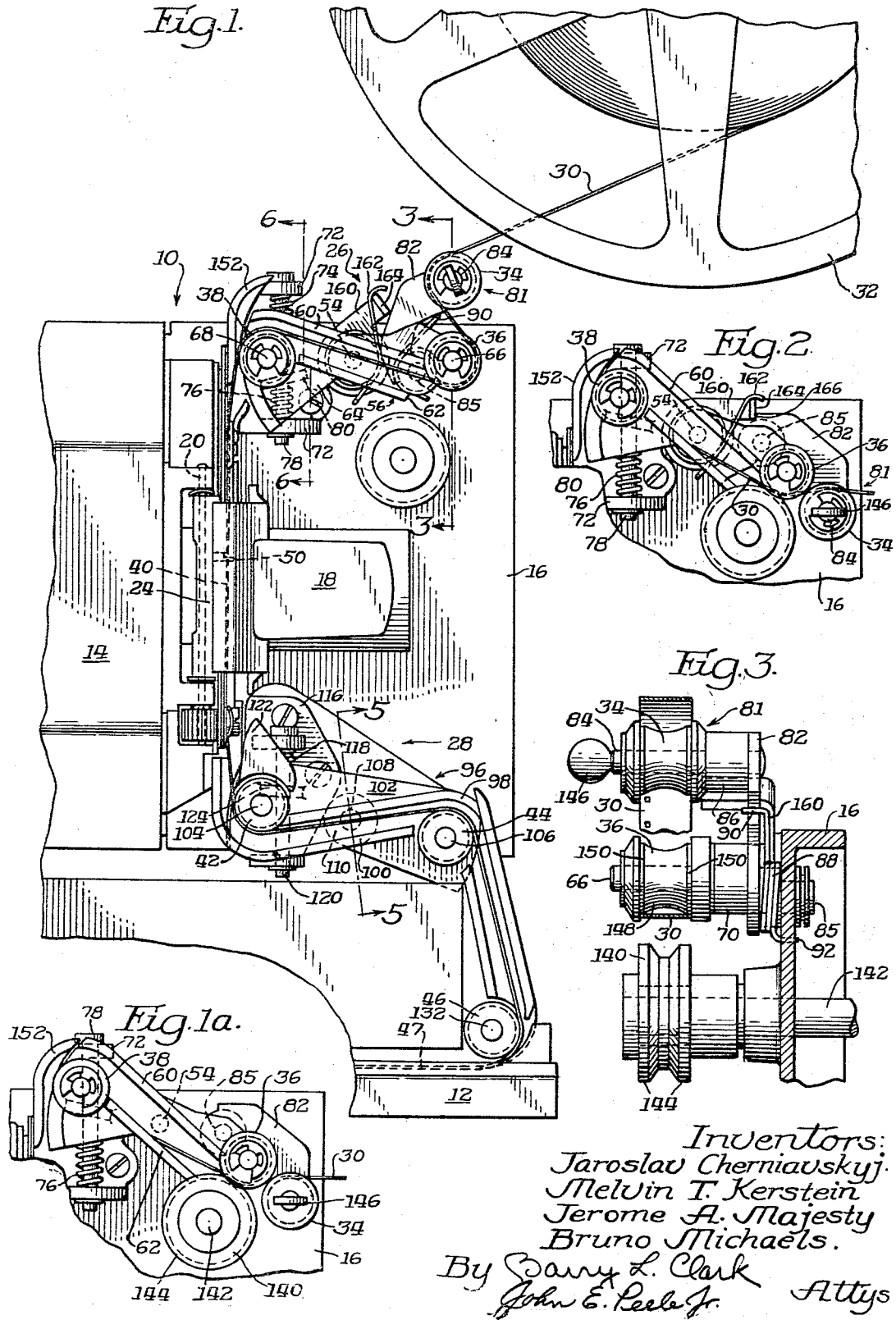

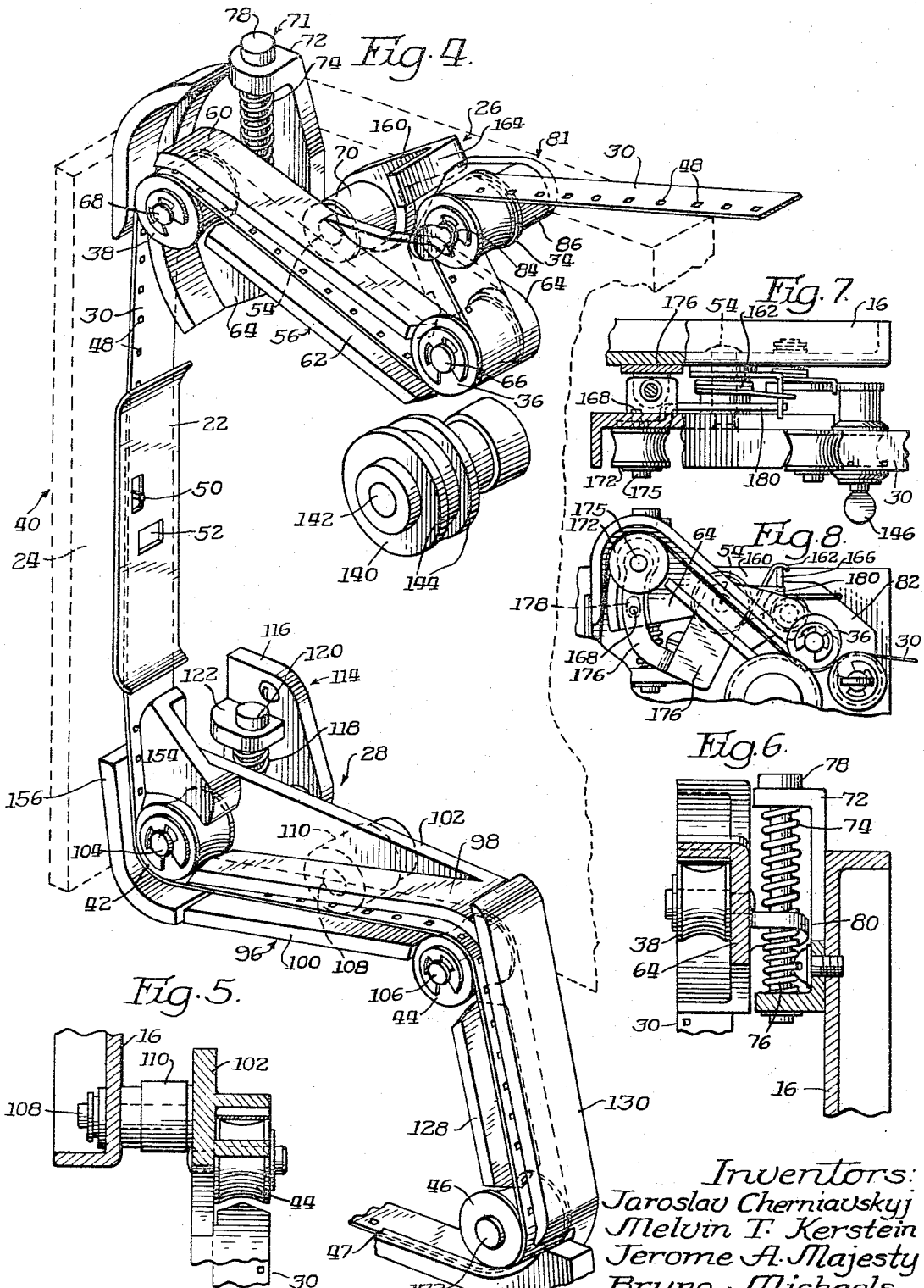

3,331,541
SPROCKETLESS PROJECTOR
Jaroslav Cherniavskyj, Skokie, Melvin T. Kerstein, Chicago, Jerome A. Majesty, Skokie, and Bruno Michaels, Chicago, Ill., assignors to Bell & Howell Company, Chicago, Ill., a corporation of Illinois
Filed June 7, 1965, Ser. No. 461,970
23 Claims. (Cl. 226—60)

This invention relates to threaded film devices and more particularly to a sprocketless moving picture projector.

A moving picture projector sequentially projects a series of pictures or frames from a film onto a suitable viewing surface. This is done by driving the film past a film gate in an intermittent motion. That is, each frame is held stationary in the film gate during the time when it is projected upon the viewing surface. Although a person viewing the projected pictures actually sees a series of individual scenes, his persistence of vision permits him to interpret the series of pictures as though he were seeing the objects in the scene undergo normal motions.

In order to provide for intermittent motion of the film past the film gate, the film is usually perforated along at least one edge thereof and is intermittently driven past the film gate by means of a generally reciprocating shuttle member. The shuttle has a tooth or the like which is adapted to engage with the perforations in the film only during motion of the shuttle in the direction in which it is desired to intermittently move the film.

Most film handling devices have a supply reel and a take-up reel. It is common to provide some type of a constant speed device for rotating the take-up reel so that the film may be wound thereon after it has been moved past the film gate. It is also common for a moving picture projector to have constantly driven sprockets mounted both before and after the film gate. The teeth of the sprockets are adapted to engage with the perforations in the film so that the constantly driven sprockets can aid in feeding the film to the film gate prior to projection or, in removing the film from the film gate after its pictures have been projected. One of the major problems that is encountered in this sprocket-type of film driving mechanism is that there must be a transition between the constant speed imparted to the film by the sprockets or take-up reel and the intermittent motion past the film gate caused by the reciprocating shuttle mechanism. One solution for this problem is to provide loops of film between the sprockets and the film gate. In this manner, for the pre-film gate loop, for example, the film can be delivered to the loop at a constant speed by the sprocket and intermittently withdrawn from the loop by the shuttle. Any differences between the instantaneous speeds of the film at the sprocket or the film gate are absorbed by a change of size in the loop. Loop forming mechanisms, therefore, have become customary and necessary parts of moving picture projectors.

The sprockets on the projector just described are looked upon by those skilled in the art as necessary evils. This is especially true in the case of automatically threaded moving picture projectors wherein the spacing and timing between the various sprockets and the shuttle must be very precise in order that all of the various sprocket and shuttle teeth are in alignment with the perforations in the film at any given time. In order to avoid the use of sprockets, therefore, many attempts have been made to pull the film from the supply reel by means of the shuttle tooth alone, the film entering the film gate merely passing over a series of idler rollers located between the supply reel and the film gate. The fruits of these attempts have generally been unsatisfactory for two reasons. Firstly the film has tended to be jerked off of the supply reel, causing the film tension upon entry into the film gate to vary considerably, whereby the film "bounces" and the projected picture is either unpleasant to view or wholly unintelligible. Secondly, the stresses placed upon the film perforations by the shuttle mechanism cause the perforations to rip. Consequently, it is a major objective of this invention to provide a sprocketless moving picture projector that does not have the above drawbacks. That is to say, it is an object of this invention to provide a sprocketless moving picture projector that produces a picture which is pleasant to view and wherein the film is not damaged as it is intermittently moved past the film gate.

It is another object of this invention to provide a sprocketless projector having an automatic threading mechanism associated therewith.

It is still another object of this invention to provide an automatically threaded sprocketless projector wherein the automatic threading mechanism is adapted to be latched into operation until such time as the film has been threaded into the projector.

It is yet another object of this invention to provide a latchable automatic threading mechanism for a sprocketless projector wherein the latch is automatically released after the film is threaded into the projector.

A still further object of the invention is to provide an automatic threading mechanism wherein the film is readily accessible for splicing or editing and the like.

In accordance with the principles of the invention, the film from a supply means coacts with a first sprocketless guide means on the projector, then with a second sprocketless guide means, and then enters a substantially standard film gate. The first guide means is biased in a direction so as to tend to pull the film from the supply means. The second guide means is biased in a direction so as to tend to pull the film from the film gate, and a shuttle mechanism is adapted to intermittently move the film past the film gate. In this manner, if the tension on the film between the supply means and the first guide means becomes larger than some predetermined desired amount as determined by the biasing force associated with the first guide means, the first guide means removes additional film from the supply means. On the other hand, if the tension between the second guide means and the film gate becomes smaller than some predetermined desired amount as determined by the size of the biasing force associated with the second guide means, the second guide means tends to withdraw a slight amount of film from the film gate to maintain a substantially constant tension on the film at the film gate.

In order that the film may be automatically threaded through the above described sprocketless projector, a separate drive means is provided for initially driving the film through the sprocketless guide means and into the film gate. Means are also provided for selectively engaging the independent drive means with the film for the period of time that is required for the film to traverse the sprocketless guide means and enter the film gate. A plurality of film guide channels are also provided to guide the film during the automatic threading operation.

In accordance with a further aspect of the invention, a latch mechanism is provided for latching the independent drive means into coactive relationship with the film during the automatic threading operation.

According to the principle of still another aspect of the invention, a separate unlatching mechanism is provided which is operative in response to tension on the film between the second sprocketless guide means and the film gate to unlatch the automatic threading latch whereby the independent drive means is disengaged from the film.

Because the projector of the invention is sprocketless, one of its major advantages is that it is compatible with a variety of film sizes and formats such as standard 8 and Super 8. In other words, the spacing between the perforations in different types of films has very little effect upon the projector's operating capabilities. It is merely necessary to change the throw of the shuttle in order for the sprocketless projector to change from a film having one preforation pattern to a film having another. Similarly, it is merely necessary to change the size of the projector's aperture plate in order for it to accommodate films of different formats.

The foregoing and other objects, features, and advantages of this invention will be apparent from the following more particular description of preferred embodiments thereof, as illustrated in the accompanying drawings wherein the same reference numerals refer to the same parts throughout the various views.

The drawings are not necessarily intended to be to scale, but rather are presented so as to illustrate the principles of the invention in clear form.

In the drawings:

FIG. 1 is a side elevational view of a sprocketless projector embodying the invention;

FIG. 1a is a side elevational view of a portion of a sprocketless projector substantially as shown in FIG. 1, but illustrating an embodiment of the invention that does not include an automatic threading latch mechanism;

FIG. 2 is a side elevation of a portion of the sprocketless projector of FIG. 1 at a time when the automatic threading mechanism is latched into its threading position;

FIG. 3 is a vertical sectional view taken along the lines 3—3 of FIG. 1 depicting a portion of the automatic threading mechanism in its unlatched position;

FIG. 4 is a perspective view of a sprocketless projector embodying the invention;

FIG. 5 is a sectional view taken along the lines 5—5 in FIG. 1 depicting a portion of a tensioning mechanism located between the film gate and a take-up reel;

FIG. 6 is a vertical sectional view taken along the lines 6—6 of FIG. 1;

FIG. 7 is a horizontal sectional view of an automatic unlatching mechanism used in connection with an alternative embodiment of the invention; and, FIG. 8 is an elevational view of the automatic unlatching mechanism of FIG. 7.

Referring now to the drawings, an embodiment of the invention will be described as applied to a moving picture projector for projecting pictures from successive frames of a film upon a viewing surface.

With reference to FIG. 1, a moving picture projector 10 is mounted on a base plate 12 and includes a lamp housing 14 alongside of which a support plate 16 is mounted. A lens housing 18 is pivotally mounted to the lamp housing by means of a hinge pin assembly 20. A pressure plate 22 (FIG. 4) is mounted on the lens housing between the lens and the lamp housing 14. Directly behind the pressure plate 22 is the usual aperture plate, not shown. The aperture plate is mounted on a plate 24 which comprises the forward portion of the lamp housing in FIG. 1. Plate 24 is shown in phantom outline in FIG. 4. The lens housing is adapted to be swung away from its position shown in FIG. 1 to permit cleaning of the lenses, pressure plate, and aperture plate. For the sake of clarity, the lens housing is not shown in FIG. 4.

An upper threading assembly 26 is located on the upper portion of the support plate 16 in FIGS. 1 and 4 and a lower threading assembly 28 is located on the lower portion of the support plate 16. When the projector is threaded, the film 30 passes from a supply reel 32, over a snubber roller 34, under another roller 36 and over yet another roller 38. The film 30 then moves downwardly in FIG. 4 between the pressure plate 22 and the aperture plate, now shown. The portion of the projector between the pressure plate and the aperture plate is generally referred to as the film gate 40 which will be subsequently described in more detail. After leaving the film gate, the film 30 passes under a roller 42, over another roller 44, and then under yet another roller 46 from which the film passes through a guide channel 47 towards a take-up means, not shown.

The film has a plurality of equally spaced perforations 48 along one edge thereof. As the film passes through the film gate, the perforations 48 are sequentially engaged by any suitable intermittent drive means such as a tooth 50 of a shuttle mechanism not shown. As is customary, the shuttle mechanism is adapted to move the tooth 50 in a reciprocating motion upwardly and downwardly in FIG. 4. The tooth is adapted to engage with the perforations 48 during its downward stroke thereby pushing the film downwardly through the film gate. Additionally, the location and stroke of the shuttle tooth are such that sequential frames of film appear at an aperture 52 in the pressure plate after each downward stroke of the shuttle. The aperture plate also has an aperture corresponding to the aperture 52 of the pressure plate. In this manner, light from the lamp housing 14, when permitted by a suitable shutter mechanism, not shown, is able to pass through the frame of film located at the aperture portion of the film gate. The picture is then projected through a lens and onto a viewing surface in the conventional manner. The pressure plate is biased to the left in FIG. 4 by a means also not shown, so as to tend to hold the film 30 stationary at the film gate except for the time that it is undergoing downward motion by virtue of its engagement with the shuttle tooth 50. It is imperative that this relatively stationary relationship between the film and the aperture portion of the film gate be maintained during the time that a given picture is being projected. The structure about to be described functions to maintain this stationary relationship between the film and the film gate during projection time and perhaps more importantly does so without any loop forming structure and without any sprocket-type of film drive mechanism.

A shaft 54 is affixed to the support plate 16. A film guide means generally referred to as 56 is comprised of an upper guide channel member 60 and a lower guide channel member 62 both of which are mounted on a film guide plate 64. As is best shown in FIG. 4, rollers 36 and 38 are mounted on shafts 66 and 68, respectively, which are fastened to opposite ends of the film guide plate 64. The film guide plate 64 is in turn mounted at its center on shaft 54, but spaced from the support plate 16 by a spacer 70.

An upper tension assembly 71 is comprised of a spring housing 72 which is fastened to the upper left hand corner of the support plate 16. As best seen in FIG. 6, the spring housing 72 functions to retain two springs 74 and 76 on a vertical shaft 78. An ear 80 extends from the right of the film guide plate 64 (FIG. 6) and is slidably mounted on the vertical shaft 78 between the two springs 74 and 76 by means of an aperture in the ear 80. When the film 30 is moved downwardly by the shuttle tooth 50, the roller 38 also moves downwardly causing the ear 80 to compress the spring 76. In this manner, and because the film guide plate is pivotally mounted on the shaft 54, the roller 36 at the right end of the film guide means is moved upwardly. On the other hand, if the tension in the film between the film gate and the roller 38 tends to decrease, the spring 76 moves the ear 80 and hence the roller 38 upwardly. In this manner, the tension in the film between the film gate and the roller 38 is maintained as constant as the force characteristics of the spring 76 permit.

A snubber assembly 81 is comprised of a link 82 which has one end thereof pivotally mounted on a shaft 85 which is affixed to the vertical support plate 16 (FIGS. 1-3). A shaft 84 is mounted on the other end of the link 82. The snubber roller 34 is rotatably mounted on the shaft 84 but spaced from the link 82 by means of a spacer 86 as shown in FIG. 3. A torsion spring 88 has one end 92 thereof affixed to the support plate 16 as shown in FIG. 3, and the other end 90 thereof in engagement with the link 82, biasing the link, and hence the snubber roller 34 upwardly or counterclockwise as viewed in FIG. 1.

Having described the structure of the upper threading assembly 26 which is comprised of the film guide means 56, the tension assembly 71, and the snubber assembly 81, the operation thereof will now be described. It should first be noted, however, that in the preferred embodiment of the invention being described, the reel 32 is not completely free, but is permitted to rotate in a clockwise direction by means of a slip clutch of a type commonly used in the art. As is similarly customary, the heavier the reel, the greater the counterclockwise biasing force that is provided. In this manner, as the film 30 is pulled from the reel in a manner about to be described, the inertia of the reel is not permitted to cause the film to unwind therefrom.

Assume for the moment that the film 30 is threaded into and through the upper threading assembly, the film gate area, and the lower threading assembly, and is being taken up by the take-up reel in the manner previously described. Further assume that the shuttle tooth 50 is in its lowermost position and is just being withdrawn from one of the film perforations 48. At this time, the picture framed by the aperture plate is being projected and it is desired that the film be held stationary at the film gate by means of friction between the pressure plate and the aperture plate. During the time that the shuttle tooth 50 was drawing the film downwardly into its present position, the rollers 34 and 38 were being moved downwardly against their respective biasing springs 88 and 76. Hence, at the assumed time, when the shuttle tooth 50 is at its lowermost position, the roller 34 is also at its lowermost position and the force of the torsion spring 88 upon the link 82 is at a maximum. Consequently, as the end 90 of the torsion spring pushes upwardly on the link 82, some of the film 30 unwinds from the reel 32. As this occurs, the tension in the portion of the film between the roller 38 and the film gate tends to decrease slightly whereupon the spring 76, also exerting a maximum force, acts upon the ear 80, forcing the left end of the film guide means upwardly in FIG. 1, whereupon the tension in the film at the film gate is maintained substantially constant, although somewhat less depending upon the force characteristics of the springs 76 and 88.

Although the two springs 76 and 88 quite apparently act in concert, it is convenient to refer to the snubber assembly 81 and its spring 88 as controlling the removal of film from the reel. Similarly, it is convenient to refer to the tension assembly 71 and the roller 38 as controlling the tension of the film as it enters the film gate. This terminology will be employed, therefore, throughout the remainder of the specification, but the reader should not lose sight of the fact that the springs 88 and 76 and their respectively associated components are not coactively separable.

The lower threading assembly functions in a manner similar to the upper threading assembly just described except that there is no need for a snubber assembly corresponding to snubber assembly 81. The lower threading assembly, best shown in FIG. 4, is comprised of a film guide means 96 having an upper guide channel member 98 and a lower guide channel member 100, both of which are mounted on a film guide plate 102. Rollers 42 and 44 are rotatably mounted on opposite ends of the film guide plate 102 by means of shafts 104 and 106, respectively. The entire film guide means 96 is rotatably mounted on one end of a shaft 108, the other end of which is affixed to the support plate 16. As in the upper threading assembly, the lower film guide means 96 is spaced from the support plate 16 by means of a spacer element 110.

A lower tension assembly 114 comprises a spring housing 116 affixed to the support plate 16. A spring 118, corresponding to spring 76 of the upper threading assembly, is mounted on a vertical shaft 120 between a flange 122 on the spring housing and an ear 124 affixed to the film guide plate 102. The ear 124 corresponds to the ear 80 and is similarly slidably mounted on the vertical shaft 120. The lower film guide means 96 functions in the same manner as the upper film guide means 56. That is, the roller 42 is biased by means of the spring 118 acting upon the ear 124 of the film guide plate thus tending to withdraw the film 30 from the film gate. Hence, when the shuttle tooth 50 moves downwardly in FIG. 4, the tension in the film between the film gate and the roller 42 is maintained by the spring 118. When the film is held stationary in the film gate and the shuttle tooth 50 moves upwardly, the take-up means tends to increase the tension in the film between the film gate and the roller 42. The roller 42 moves upwardly, however, overcoming the bias of the spring 118 whereby the film tension is maintained relatively constant depending upon the force characteristics of the spring 118.

The remainder of the lower threading assembly is comprised of film guide channel members 128 and 130, roller 46 and the lower guide channel 47. As will be apparent from FIG. 4, after leaving roller 44 the film passes through the channel formed by members 128 and 130, under the roller 46 and on through the lower channel 47 to the take-up means.

A shaft 132 extends through the roller 46 and is suitably fastened to the projector. The film guide channel member 130 is pivotally mounted on the shaft 132 so that the channel member can be moved downwardly and to the right as viewed in FIGS. 1 and 4. In this manner, the film can be easily removed from the threading assembly in order that splicing operations or the like may be performed thereon.

The above described apparatus provides a simple and inexpensive means for driving film through a projector without the need for either sprockets or elaborate loop forming mechanisms. Moreover, because of the ability of the above described structure to both pull the film from the supply means and keep a relatively constant tension on the film as it enters the film gate, the projected image at the viewing station is as stable as though the previously necessary drive sprockets and loop forming mechanisms has been employed. In addition, although the drive sprockets have been eliminated, the unique use of the spring biased guide means disclosed in connection with the instant invention permits a standard type of shuttle tooth to provide the sole external means for driving the film through the film gate without the film perforations being damaged as has been heretofore experienced. Furthermore, because the instant invention does not require the use of drive sprockets, it is compatible with a wide range of film sizes and formats. The only change that is required is in the size of the aperture at the film gate, and the length of stroke of the shuttle tooth. These modifications, however, form no part of the instant invention and hence will not be further discussed herein. Similarly, it will be appreciated by those skilled in the art without further description that although a reel is illustrated as a supply means that any suitable type of supply means can be employed such as a cartridge, for example.

The above described structure also has a decided advantage in that the film is very easily removed from the threading assemblies thus making it readily available for splicing or the like.

Having described the projection mode of the sprocketless projector of the invention, the automatic threading mode thereof will now be described. With reference to FIG. 1a, the structure is basically the same as that previously described with the addition of a threading drive wheel 140 affixed to a shaft 142 which is rotatably mounted in the support plate 16 and independently driven by means not shown. The threading drive wheel is capped with friction drive surfaces 144, such as soft rubber, for example. The function of these surfaces will become apparent from the subsequent description. A handle 146 is affixed to the shaft 84 for rotating the roller 34 and link 82 downwardly and to the right, as viewed in FIGS. 1 and 4, into the position shown in FIG. 1a. As the link 82 is pivoted downwardly about the shaft 85 in FIGS. 1 and 4 against the bias of spring 88, it engages with the spacer 70 and causes the entire film guide means 56 to pivot in a clockwise direction about the shaft 54. In this manner, the roller 36 is brought into engagement with the friction surfaces 144 of the threading drive wheel 140 as illustrated in FIG. 1a.

In order to thread the film 30 from the reel 32, it is merely necessary for the operator to depress the threading handle 146 into the position of FIG. 1a and place the end of the film over the snubber roller 34 and between the roller 36 and the friction surface 144 of the threading drive wheel 140. The rollers in the sprocketless projector being described are generally cylindrical in shape, but are relieved at their center portions. This is illustrated, for example, in FIG. 3, where roller 36 is shown as having a relieved portion 148 near its center and guide ridges 150 along each edge thereof. In this manner, the film is driven only by its edges with its center portions being free of frictional contact so as to prevent the film from being scratched. It is the driving forces between the friction surfaces 144, the edges of the film 30, and the guide ridges 150 that initially pull the film 30 off of the reel and drive it forwardly into the projector's upper threading assembly. After the film is grasped between the threading drive wheel and the guide ridges 150 of the roller 36, it is propelled upwardly in FIG. 1a between the upper and lower guide channel members 60 and 62. The film is then guided over the roller 38 whereupon it strikes an upper stationary guide member 152 and is deflected towards the film gate. The film is then driven downwardly between the pressure plate 22 and the aperture plate until it is engaged by the shuttle tooth 50 as described above. At this time, the operator may release his downward pressure from the threading handle 146 and the film will be driven through the remainder of the projector by the shuttle tooth. Briefly, the film moves downwardly between a deflection block 154 and a lower stationary guide member 156; under the roller 42; between the lower guide channels 98 and 100; over the roller 44; then through the film guide channel comprised of the members 128 and 130; and finally, the film passes under the roller 46 after which it is directed towards the take-up means through the lower guide channel 47.

Once the film has been automatically threaded in the manner just described, it is driven through the sprocketless projector as set forth in the initial portions of the specification. Hence, not only has a unique type of sprocketless projector been described but it has been combined with a manually latched automatic threading mechanism. That is, the operator manually latches the upper threading assembly into its threading mode by depressing the lever 146 and holding it in its lowermost position until the film is engaged with the shuttle tooth 50.

An aspect of the invention will now be described wherein the projector is latched into its threading mode as soon as the operator depresses the threading handle 146. With reference to FIGS. 1 and 2, a latching link 160 is pivotally mounted on the shaft 54. A torsional biasing spring 162 is also mounted on the shaft 54. One end of the biasing spring is affixed to the support plate 16 and the other end engages with a latching arm 164 of the latching link 160. The spring functions to bias the latching link and its arm 164 in a clockwise direction so as to continually rest upon the link 82 of the snubber assembly 81.

The latch operates as follows: when the operator depresses handle 146 to bring the roller 36 into engagement with the threading drive wheel 140 preparatory to threading the film therebetween, the link 82 is rotated into the position shown in FIG. 2. Due to the biasing force of spring 162, the latching arm 164 follows the motion of link 82 until the latching arm engages with a latching step portion 166 of the link 82. This coaction between the latching arm 164 and the latching step 166 prevents the link 82 from moving upwardly even though the operator no longer depresses the threading handle 146. The upper threading assembly is shown in its latched position in FIG. 2. When the projector is automatically latched, the film may be automatically threaded into and through the projector and onto the take-up means as described above. When the upper threading assembly is latched into its threading mode, however, certain undesirable stresses are placed upon the film as soon as it comes into engagement with the shuttle tooth 50. Hence, it is desirable that the upper assembly be returned to its projection mode of operation as was described in the initial portions of this specification. This may be accomplished by one of three methods. The first is for the operator to merely move the threading handle 146 upwardly thereby permitting the latching step portion 166 of the link 82 to rotate under latching arm 164 of the latching link 160 and overcome the force of the torsional biasing spring 162. The releasing operation of link 82 can also be accomplished by applying downward pressure on channel member 60. When this occurs, the roller 36 is removed from its engagement with the threading drive wheel 140 and the projector is in its projection mode. That is, the film is driven through the projector by means of the shuttle tooth only—the proper tension being maintained on the entering film by means of the previously discussed coaction between the tension assembly 71 and the snubber assembly 81.

During the automatic threading operation, the threading drive wheel 140 is independently driven so as to propel the film into the upper threading assembly at a rate which is somewhat less than the rate at which the shuttle tooth drives the film downwardly once the film is engaged therewith. This speed differential between the drive wheel 140 and the shuttle tooth 50 gives rise to a second, and what might be termed "semi-automatic" apparatus for changing the upper threading assembly from its threading mode to its projection mode. As soon as the film is engaged by the shuttle tooth 50, the film begins to be driven downwardly through the film gate more rapidly than it is driven forwardly by the threading drive wheel 140. Hence, the roller 38 is forced downwardly against the bias of spring 76, whereby the entire film guide means 56 is rotated in a counterclockwise direction in FIG. 2. When this occurs, the roller 34 is taken out of engagement with the threading drive wheel 140, forcing the link 82 upwardly and the step portion 166 thereof to slide under the latching arm 164 of the latching link 160 whereby the snubber assembly biasing spring 90 returns the upper threading assembly to its projection mode. This, then, is the second means for changing the upper threading assembly from its threading mode to its projection mode. It should be noted, however, that for this second type of unlatching to take place, there must be a differential driving motion between the threading drive wheel 140 and the shuttle tooth 50. It should be further noted that as soon as the film guide means 56 begins to rotate in its counterclockwise direction, the film is no longer driven into the upper threading assembly by the threading drive wheel 140 and the differential motion between the threading drive wheel and the shuttle tooth is lost. Tests have shown that depending upon the forces exerted by the several springs 88, 162 and 76 when the threading mechanism is latched and to a lesser extent on the type of film employed, the age of the film, the atmospheric conditions, and the like, this second method of changing the upper threading assembly into its projection mode is not always reliable permitting the shuttle tooth to feed film without releasing the threading mechanism whereupon the operator must resort to the previously discussed manual unlatching operation.

It will be appreciated from the above discussion that it is most desirable that the upper threading assembly be positively automatically unlatched from its threading mode as soon as the film is engaged by the shuttle tooth 50. Hence, an aspect of the invention will now be described wherein this desirable result is accomplished.

With reference to FIGS. 7 and 8, a pin 168 is affixed to the film guide plate 64. A roller 172 corresponds to the previously described roller 38, but differs therefrom in the following respect; the roller 38 was mounted upon a shaft 68 affixed to the film guide plate 64. The roller 172, on the other hand, is rotatably mounted on a shaft 175 which is affixed to an unlatching link 176 which is pivotally mounted on the shaft 54. A slot 178 on the unlatching link 176 is located so as to slidably engage with the pin 168. In this manner, insofar as the limits of slot 178 permit, the unlatching link 176 and the roller 172 are adapted to rotate about the shaft 54 independently of the guide plate 64. An unlatching arm 180 on the unlatching link 176 is located underneath the latching arm 164 of the latching link 160 as shown in FIG. 8. The operation of the automatic unlatching structure is as follows: just as in the other aspects of the invention, the operator commences the threading operation by pushing downwardly on the threading handle 146. This causes the link 82 to pivot in a clockwise direction and bring the roller 36 into engagement with the threading drive wheel 140. At this time, the torsional biasing spring 162 causes the latching arm 164 of the latching link 160 to hold the latching step portion 166 of the link 82 in its threading mode position as shown in FIG. 8. When the film is placed over the snubber roller 34, and between roller 36 and the threading drive wheel 140, it is propelled through the upper threading assembly and into the film gate as previously described. As soon as the shuttle tooth 50 engages a perforation in the film, the differential in motion between the shuttle tooth 50 and the threading drive wheel 140 causes the film to draw the roller 172 downwardly in FIG. 8. As the roller 172 moves downwardly, the unlatching link pivots about the shaft 54 in a counterclockwise direction, forcing the unlatching arm 180 thereof to move upwardly and force the latching arm 164 out of engagement with the latching step portion 166 of the latching link 160. This motion occurs independently of the film guide means 56. Hence, while the latching arm 164 is being unlatched by the unlatching arm 180, the film is still engaged between the roller 36 and the threading drive wheel 140. Remembering that the "semi-automatic" unlatching mechanism described above was adversely affected by motion of the roller 36 away from the drive wheel 140 during the unlatching operation, it will be appreciated that the automatic unlatching structure just described obviates this problem. That is, by permitting the roller 172 to move independently of the roller 36, the latching arm 164 is unlatched before the roller 36 is moved out of its threading position. As soon as the latching arm 164 is moved upwardly by the unlatching arm 180, the shuttle tooth 50 continues to draw the film downwardly whereupon the upper portion of the slot 178 forces the pin 168 and hence the film guide means 56 to pivot in a counterclockwise direction about the shaft 54, whereupon the upper threading assembly is returned to its projection mode.

In view of the above description, it will be appreciated by those skilled in the art that not only has a sprocketless projector been described but also one which may be automatically threaded; one which may be automatically latched into a threading mode of operation; and one which is automatically unlatched from the threading mode and placed in a projection mode of operation as soon as the film is engaged by the shuttle at the film gate.

While the invention has been particularly shown and described with reference to preferred embodiments thereof, it will be understood by those skilled in the art that various changes in form and details may be made therein without departing from the spirit and scope of the invention.

The embodiments of the invention in which an exclusive property or privilege is claimed are defined as follows:

1. In a film projection apparatus having a film supply means and a projection station located in a film gate, a mechanism for transporting said film from said supply means past said projection station at said film gate comprising: a first sprocketless guide means; a second sprocketless guide means; said first and second sprocketless guide means being located between said supply means and said film gate and adapted to engage with said film; means located at said film gate and adapted to intermittently move said film past said projection station; first biasing means biasing said first sprocketless guide means in a direction for tending to pull said film from said supply means; and second biasing means for biasing said second sprocketless guide means in a direction for tending to pull said film from said film gate, whereby the guide means maintain a relatively constant tension on said film as it is incrementally moved past said projection station.

2. The mechanism of claim 1 wherein said second guide means is comprised of: a film guide plate; a first roller mounted on one end of said film guide plate; a second roller mounted on the other end of said film guide plate; and including means for pivotally mounting said film guide plate on said projector so that said film guide plate pivots about a point between said first and second rollers.

3. The apparatus of claim 2 including an independent drive means adapted to drive said film past said second guide means and into said film gate when said film is brought into engagement therewith; mounting means for pivotally mounting said first sprocketless guide means on said projector, said film guide plate being adapted to pivot in response to pivotal motion of said first sprocketless guide means so that said first roller brings said film into engagement with said independent drive means; and means to pivot said first sprocketless guide means so as to cause said film to be brought into engagement with said independent driving means whereby said projector is placed in a threading mode.

4. The apparatus of claim 3 including means to latch said first sprocketless guide means in a threading position.

5. The apparatus of claim 4 including means responsive to the engagement of said film with said shuttle for releasing said latch, whereby said projector is placed in a projection mode.

6. The apparatus of claim 4 wherein said second roller is adapted to undergo limited independent motion with respect to said film guide plate in response to a substantial increase in tension in said film between said film gate and said second roller; and unlatching means adapted to follow said independent motion of said second roller, said unlatching means having a portion thereof adapted to engage with and unlatch said latching means when said second roller undergoes said independent motion, whereby said latch is unlatched when the film is engaged by said intermittent drive means and said first guide means is placed in a projection mode.

7. In a film projection apparatus having a film supply means and a projection station located in a film gate, a mechanism for transporting said film from said supply means past said projection station at said film gate comprising: a film guide plate; a first sprocketless guide member mounted on one end of said film guide plate; a second sprocketless guide member mounted on the other end of said film guide plate; means for pivotally mounting said film guide plate on said projector so that said film guide plate pivots about a point between said first and second guide members; said guide members being located between said supply means and said film gate and adapted to engage with said film; means located at said film gate and adapted to intermittently move said film past said projection station; and biasing means for biasing said guide plate in a direction for tending to pull said film from said film gate, whereby the guide members maintain a relatively constant tension on said film as it is incrementally moved past said projection station.

8. In a film projection apparatus having a film supply means and a projection station located in a film gate, a mechanism for transporting said film from said supply means past said projection station at said film gate comprising: a first sprocketless roller means; second sprocketless roller means, said sprocketless roller means being located between said supply means and said film gate and adapted to engage with said film; a reciprocating shuttle located at said film gate and having a tooth thereof for engaging with perforations in said film and intermittently moving said film past said projection station; a first spring means for urging said first sprocketless roller means in a direction for tending to pull said film from said supply means; and a second spring means for urging said second sprocketless roller means in a direction for tending to pull said film from said film gate, whereby the first and second sprocketless roller means maintain a relatively constant tension on said film as it is incrementally moved past said projection station by said reciprocating shuttle mechanism.

9. The mechanism of claim 8 wherein said second sprocketless roller means is comprised of: a film guide plate; a first roller mounted on one end of said film guide plate; a second roller mounted on the other end of said film guide plate; and including means for pivotally mounting said film guide plate on said projector so that said film guide plate pivots about a point between said first and second rollers.

10. The apparatus of claim 9 including an independent drive means adapted to drive said film past said second sprocketless roller means toward said film gate when said film is brought into engagement therewith; and means to selectively engage said film with said independent drive means whereby said projector is placed in a threading mode.

11. The apparatus of claim 9 including an independent drive means adapted to drive said film past said second sprocketless roller means and into said film gate when said film is brought into engagement therewith; mounting means for pivotally mounting said first sprocketless roller means on said projector, said film guide plate being adapted to pivot in response to pivotal motion of said first sprocketless roller means so that said first roller brings said film into engagement with said independent drive means; and means to pivot said first sprocketless roller means so as to cause said film to be brought into engagement with said independent driving means whereby said projector is placed in a threading mode.

12. The apparatus of claim 11 including means to latch said first sprocketless roller means in a threading position.

13. The apparatus of claim 12 including means responsive to the engagement of said film with said shuttle for releasing said latch, whereby said projector is placed in a projection mode.

14. The apparatus of claim 12 wherein said second roller is adapted to undergo limited independent motion with respect to said film guide plate in response to a substantial increase in tension in said film between said film gate and said second roller; and unlatching means adapted to follow said independent motion of said second roller, said unlatching means having a portion thereof adapted to engage with and unlatch said latching means when said second roller undergoes said independent motion, whereby said latch is unlatched when the film is engaged by said intermittent drive means and said first sprocketless roller means is placed in a projection mode.

15. In an apparatus for projecting the pictures of a film, the combination comprising: a supply means; a take-up means; a film gate comprised of a pressure plate and an aperture plate; a projection station located at said film gate; means for moving said film between said aperture plate and said pressure plate in a direction from said supply means toward said take-up means, said means for moving said film being adapted to intermittently hold said film stationary at said projection station; a first threading assembly located between said supply means and said film gate; a second threading assembly located between said film gate and said take-up means; said first threading assembly being further comprised of: a first sprocketless guide means adapted to engage with said film; a second sprocketless guide means adapted to engage with said film; first biasing means for biasing said first sprocketless guide means in a direction for tending to pull said film from said supply means; and a second biasing means for biasing said second sprocketless guide means in a direction for tending to pull said film from said film gate; said second threading assembly being further comprised of: a third sprocketless guide means adapted to engage with said film; and third biasing means for biasing said third sprocketless guide means in a direction tending to pull said film from said film gate.

16. The apparatus of claim 15 including a film channel located between said third sprocketless guide means and said take-up means for confining said film and directing said film toward said take-up means; and a member on said film channel adapted to be pivoted outwardly from said film whereby access may be gained to the portion of said film located in said channel.

17. The mechanism of claim 15 wherein said second guide means is comprised of: a film guide plate; a first roller mounted on one end of said film guide plate; a second roller mounted on the other end of said film guide plate; and including means for pivotally mounting said film guide plate on said projector so that said film guide plate pivots about a point between said first and second rollers.

18. The mechanism of claim 16 wherein said second guide means is comprised of: a film guide plate; a first roller mounted on one end of said film guide plate; a second roller mounted on the other end of said film guide plate; and including means for pivotally mounting said film guide plate on said projector so that said film guide plate pivots about a point between said first and second rollers.

19. The apparatus of claim 15 including an independent drive means adapted to drive said film past said second sprocketless guide means toward said film gate when said film is brought into engagement therewith; and means to selectively engage said film with said independent drive means whereby said projector is placed in a threading mode.

20. The apparatus of claim 15 including an independent drive means adapted to drive said film past said second guide means and into said film gate when said film is brought into engagement therewith; mounting means for pivotally mounting said first sprocketless guide means on said projector, said film guide plate being adapted to pivot in response to pivotal motion of said first sprocketless guide means so that said first roller brings said film into engagement with said independent drive means; and means to pivot said first sprocketless guide means so as to cause said film to be brought into engagement with said independent driving means whereby said projector is placed in a threading mode.

21. The apparatus of claim 20 including means to latch said first sprocketless guide means in a threading position.

22. The apparatus of claim 21 including means responsive to the engagement of said film by said means for moving said film for releasing said latch, whereby said projector is placed in a projection mode.

23. The apparatus of claim 21 wherein said second roller is adapted to undergo limited independent motion with respect to said film guide plate in response to a substantial increase in tension in said film between said film gate and said second roller; and unlatching means adapted to follow said independent motion of said second roller, said unlatching means having a portion thereof adapted to engage with and unlatch said latching means when said second roller undergoes said independent motion, whereby said latch is unlatched when the film is engaged by said intermittent drive means and said first guide means is placed in a projection mode.

References Cited

UNITED STATES PATENTS

| | | | |
|---|---|---|---|
| 2,685,417 | 8/1954 | Bartelson | 226—60 X |
| 2,750,128 | 6/1956 | Hittle | 226—60 X |

M. HENSON WOOD, Jr., *Primary Examiner.*

ALLEN N. KNOWLES, *Examiner.*